(12) United States Patent
Roberts et al.

(10) Patent No.: US 7,933,204 B2
(45) Date of Patent: Apr. 26, 2011

(54) METHOD FOR ORGANIZING PACKETS BELONGING TO STREAMS, AND ASSOCIATED EQUIPMENT

(75) Inventors: James Roberts, Voisins le Bretonneux (FR); Abdesselem Kortebi, Perros Guirec (FR); Luca Muscariello, Paris (FR)

(73) Assignee: France Telecom, Paris (FR)

( * ) Notice: Subject to any disclaimer, the term of this patent is extended or adjusted under 35 U.S.C. 154(b) by 796 days.

(21) Appl. No.: 11/919,752

(22) PCT Filed: Apr. 20, 2006

(86) PCT No.: PCT/FR2006/000878
§ 371 (c)(1),
(2), (4) Date: Dec. 19, 2007

(87) PCT Pub. No.: WO2006/117448
PCT Pub. Date: Nov. 9, 2006

(65) Prior Publication Data
US 2010/0278053 A1    Nov. 4, 2010

(30) Foreign Application Priority Data

May 2, 2005   (FR) .................................... 05 04447

(51) Int. Cl.
*H04L 1/00*   (2006.01)
(52) U.S. Cl. ........................................ 370/232; 370/235
(58) Field of Classification Search ................. 370/389, 370/229, 231, 232, 233, 234, 235, 359, 395.4, 370/395.41, 395.42, 395.43
See application file for complete search history.

(56) References Cited

U.S. PATENT DOCUMENTS

| 5,748,614 | A  | * | 5/1998  | Wallmeier | 370/395.41 |
| 6,438,134 | B1 | * | 8/2002  | Chow et al. | 370/412 |
| 6,975,638 | B1 | * | 12/2005 | Chen et al. | 370/412 |

(Continued)

FOREIGN PATENT DOCUMENTS

EP    1478140    11/2004

OTHER PUBLICATIONS

Kortebi, et al. "Cross-Protect: Implicit Service Differentiation and Admission Control", IEEE HPSR 2004, p. 1-5, Apr. 2004, XP002354320.

(Continued)

*Primary Examiner* — Brenda Pham
(74) *Attorney, Agent, or Firm* — McKenna Long & Aldridge LLP

(57) ABSTRACT

The inventive method consists in determining a flow (F) to which belongs each new incoming packet (P), when said flow (F) is on a list of active flows, in introducing said packet into a fair share scheduling mechanism (6), when said flow (F) is absent from the list of active flows, in obtaining an estimation of the quantity of incoming data items (I.Bytes) with respect to said flow over a reference time period, in comparing said estimation with a maximum value (MaxBytes), wherein the reference time period or the maximum value are determined according to a fair share data rate, in adding said flow to the list of active flows and in introducing the packet (P) into the fair share scheduling mechanism (6), if said estimation exceeds the maximum value, and in introducing the packet (P) into the end of a priority queue (5), in the alternative case.

11 Claims, 8 Drawing Sheets

U.S. PATENT DOCUMENTS

| | | | |
|---|---|---|---|
| 7,342,929 B2* | 3/2008 | Bremler-Barr et al. | 370/395.4 |
| 2003/0088690 A1* | 5/2003 | Zuckerman et al. | 709/232 |
| 2003/0095551 A1* | 5/2003 | Gotoh et al. | 370/395.3 |

OTHER PUBLICATIONS

Kortebi, et al., "On the Scalability of Fair Queueing", ACM Hotnets-III, Nov. 2004, XP002354321.

Bennet, et al., "High Speed, Scalable, and Accurate Implementation of Packet Fair Queueing Algorithms in ATM Networks", IEEE, p. 7-14, 1997.

Shreedhar, et al., "Efficient Fair Queuing Using Deficit Round Robin", ACM, SIGCOMM Cambridge, MA, p. 231-242, 1995.

Goyal, et al., "Start-Time Fair Queueing: A Scheduling Algorithm for Integrated Services Packet Switching Networks", IEEE/ACM Transaction Networking, vol. 5, No. 5, p. 690-704, Oct. 1997.

Estan, et al., "New Directions in Traffic Measurement and Accounting", ACM, SIGCOMM, Pittsburgh, PA Aug. 19-23, 2002.

Bloom, B. H., "Space/Time Trade-offs in Hash Coding with Allowable Errors", Communication of the ACM, Computer Usage Company, Newton Upper Falls, MA, vol. 13, No. 7, 422-426, Jul. 1990.

* cited by examiner

| 30 | 0 | 0 | 0 | 0 | φ | 0.Next |
| 31 | F | F.Queue | F.Q | F.DC | F.FIFO | F.Next |
|  |  |  |  |  |  |  |
FIG. 6
FIG. 7
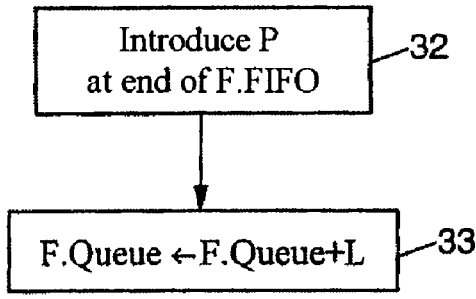
FIG. 8
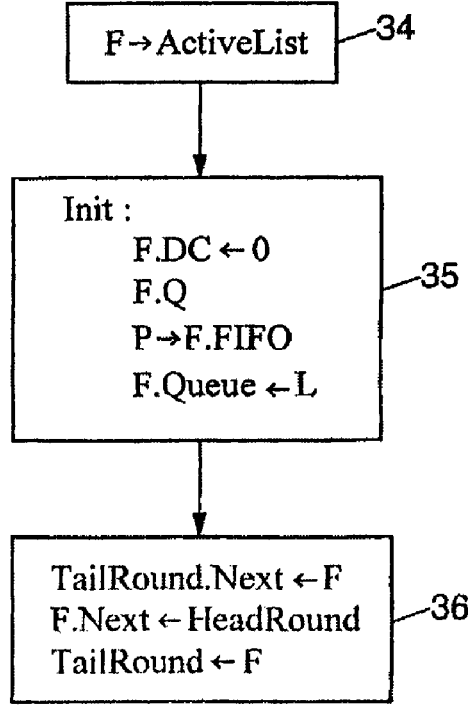

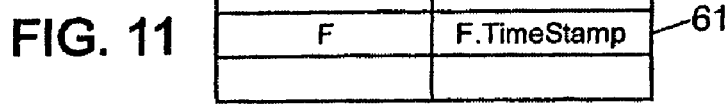
FIG. 10
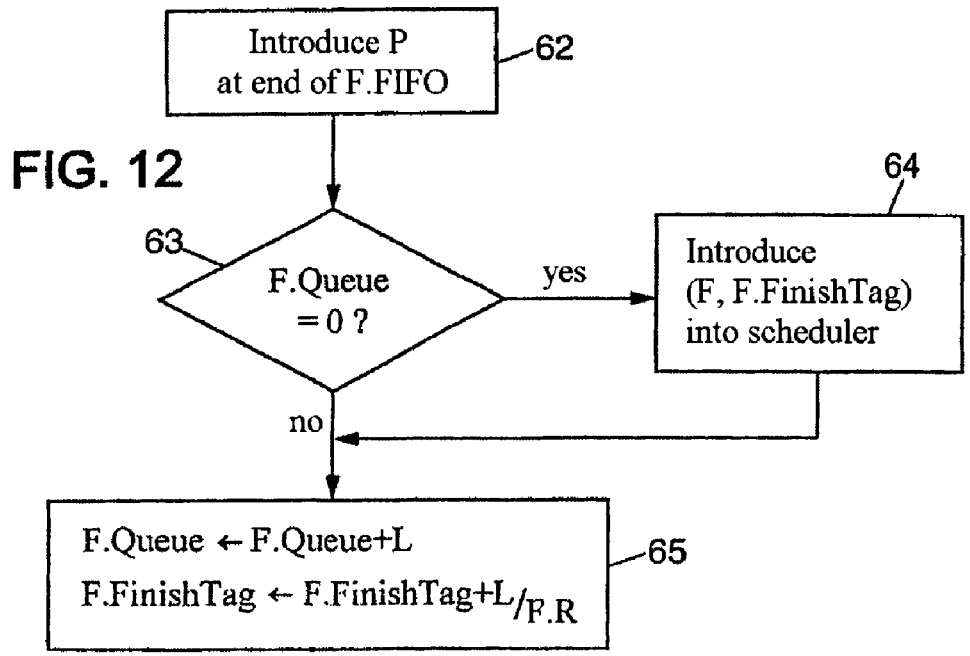
FIG. 11
FIG. 12

_US 7,933,204 B2_

METHOD FOR ORGANIZING PACKETS BELONGING TO STREAMS, AND ASSOCIATED EQUIPMENT

This application claims priority from PCT/FR2006/000878 filed Apr. 20, 2006, which claims priority from French Application FR 05 04447, filed May. 2, 2005, both of which are hereby incorporated by reference in their entirety.

FIELD OF THE DISCLOSURE

The present invention relates to the organization of packets belonging to streams, for the purpose of delivering them over a network link, for example.

BACKGROUND

A stream comprises a succession of data packets, such as IP (Internet Protocol) datagrams. It is identified by a set of attributes which are present in the header of each of the packets which it comprises. By way of example, these attributes comprise a source IP address, a destination IP address, a source port, a destination port, a protocol identification, a stream identifier ("flow label"), etc. Thus, all of the packets having the same attribute values constitute a stream.

A stream is considered to be in progress at a given instant if the time which has elapsed since its last packet was observed is below a certain threshold TO, for example in the order of a few seconds.

Packet organization mechanisms which make use of the stream concept are known. They aim to establish an order in the delivery of the packets at the output of a router, for example. In particular, there is abundant literature on fair sharing ("Fair Queuing") algorithms. These algorithms ensure a certain level of fairness between the streams when the packets are delivered. Among them, cited illustrations will be DRR (Deficit Round Robin), described by Shreedar and Varghese in "Efficient fair queuing using Deficit Round Robin", IEEE/ACM Transactions on Networking, Volume: 4, Issue: 3, June 1996, Pages: 375-385, and SFQ (Start-time Fair Queueing), described by Goyal, Vin and Cheng in "Start-time fair queueing: A scheduling algorithm for integrated services packet switching networks". IEEE/ACM ToN, Vol. 5, No 5, October 1997. DRR is a reduced-complexity organization mechanism based on cyclic processing of the streams in line with a round robin principle. A queue is associated with each stream. The stream i is authorized to send at most one fixed quantum $Q\_i$ of bytes per cycle. It thus obtains a flow rate proportional to the value of its quantum $Q\_i$. This mechanism allows a reasonable degree of fairness to be obtained by virtue of a deficit counter being kept which compensates for the possible difference in size between the packets from the different streams. The complexity is in the order $O(1)$, that is to say that it is independent of the number of streams in progress.

SFQ is a mechanism which is part of the fair sharing algorithm class sometimes called "self-clocked". The organization of the packets to be delivered is defined by a stamp attributed to each packet. The stream i is associated with a flow rate parameter $R\_i$ which determines the connection between the stamps for the packets in this stream.

The streams, in a packet network, are transitory in nature. The number of streams in progress at each instant is a variable which can reach a value of several tens of thousands over a high-capacity link (of 2.5 Gbps or more, for example). However, the number of streams which need to be known at each instant by the organization mechanism is considerably lower.

Indeed, the delivery scheduler for the packets which is set up by the organization mechanism relates only to streams, called active streams, which have at least one packet queuing for the purpose of delivering it at the instant in question or, possibly, which have had one in the very recent past. This makes it possible to implement the fair sharing organization even for very high link flow rates, because the number of active streams is independent of the flow rate of the link and is limited to a few hundred, for example.

In fact, at each instant, the traffic can be broken down into two types of streams: constrained or "bottlenecked" streams, subsequently denoted by BKD, whose flow rate at the input of the organization exceeds the fair flow rate implemented by the organization, and the other streams, denoted by NBD (for non-bottlenecked), whose flow rate at the input of the organization is lower than the fair flow rate.

EP 1478140 discloses a mechanism which operates implicit differentiation, that is to say without specific signaling or resource reservation, of the quality of service, by distinguishing between BKD and NBD streams. The packets in NBD streams are handled with priority, while BKD streams undergo fair sharing organization. Thus, "realtime"-type streams (for example audio or video streaming) whose flow rate is relatively low are subject to a slight packet delay. Conversely, "data"-type streams implement the maximum flow rate compatible with a sharing objective.

However, in the mechanism proposed by EP 1478140, NBD streams are momentarily included in the organization's structure when they send a packet. This is necessary in order to allow detection of new BKD streams, but its effect is to necessitate a relatively high capacity for this structure in comparison with that which is strictly necessary for handling BKD streams.

By way of illustration, the organization proposed in the aforementioned techniques can necessitate that several hundred streams be taken into account at certain instants for a served link load of approximately 90%. In reality, the number of streams is dependent on the characteristics of the traffic, particularly on the ratio of the flow rate of the link to the maximum flow rate of the streams (that is to say the flow rate which they would be able to attain if the link had infinite capacity, taking account of the other flow rate limitations on their path). The higher this ratio, for a majority of streams, the greater the number of NBD streams. NBD streams therefore enter the organization's structure more often.

This effect implies the need to use a large memory to identify active streams. Moreover, it implies relatively high processing complexity.

It is also understood that the dependence of the memory necessary for organization on the traffic characteristics means that the dimensioning of the organization's structures is fairly weak.

Furthermore, the fair sharing organization proposed by EP 1478140 provides for identical allocation for all streams. This limitation can be awkward in some applications, particularly in an access network in which it is desirable to distinguish between users according to the conditions provided in their subscription.

It is an object of the present invention to limit the drawbacks of the prior techniques as recalled above.

One particular object of the invention is to limit the information which needs to be taken into account by the organization and the complexity of the processing implemented.

Another object of the invention is to increase the strength of the dimensioning of the organization's structures.

Another object of the invention is to allow special conditions to be taken into account for streams from separate users.

SUMMARY

The invention thus proposes a method for organizing data packets belonging to streams, comprising the following steps, in relation to each new incoming packet:

/a/ determining the stream to which the packet belongs, a flow rate class being associated with said stream;

/b/ when said stream is part of a list of active streams, introducing the packet into a fair sharing organization mechanism for the purpose of delivering the packet, the fair sharing organization mechanism being designed to deliver the packets from each stream substantially as per the same fair flow rate weighted by the flow rate class associated with the corresponding stream;

/c/ when said stream is not part of the list of active streams:
  obtaining an estimate of the quantity of incoming data items in relation to said stream over a reference time interval;
  comparing the estimate of the quantity of incoming data items in relation to said stream over the reference time interval with a maximum value, at least either the reference time interval or the maximum value being determined on the basis of an estimate of the fair flow rate;
  adding said stream to the list of active streams and introducing the packet into the fair sharing organization mechanism for the purpose of delivering the packet, if the estimate of the quantity of incoming data items in relation to said stream over the reference time interval exceeds the maximum value; and
  otherwise, introducing the packet at the end of a priority queue for the purpose of delivering the packet.

The method of updating the list of active streams makes it possible to ensure that this list contains only streams in the BKD category. Indeed, the comparison between the estimate of the quantity of incoming data items in relation to said stream over the reference time interval and the maximum value makes it possible to determine whether the stream in question is of BKD or NBD type before the list of active streams is updated. The size of this list is thus limited substantially, as is its dependence on the characteristics of the traffic. This reduction in size also makes it possible to limit the complexity of the processing to be implemented, particularly for keeping a list of active stream up to date.

The maximum value taken into account may be dependent on the flow rate class associated with the stream in question. It may also be a predetermined fixed value, particularly if the estimate of the quantity of incoming data items is limited to a count of the number of incoming packets belonging to this stream.

A simple data structure, such as a table, may advantageously be used to estimate the quantity of incoming data items in relation to said stream. In this case, obtaining the estimate of the quantity of incoming data items in relation to said stream comprises updating, in the course of said reference time interval, a field in the table whose address corresponds to a function of an identifier of said stream, each field in the table being reset to zero at the start of the reference time interval. The function used is a hash function, for example, that is to say a function allowing creation of a digest for the identifier of said stream, with a limited degree of ambiguity.

In addition, the method may comprise a prior admission control in which it is decided whether or not the packet needs to be rejected before step /b/, on the basis of an available passband and a filling level for the priority queue. Such a control allows congestion situations to be avoided.

The method also advantageously comprises delivery of the packets in the following order: first, all of the packets introduced into the priority queue are delivered, and then at least some of the packets introduced into the fair sharing organization mechanism are delivered.

The invention also proposes a piece of equipment, such as a queue manager in a router, capable of being used to organize data packets belonging to streams, comprising, in relation to each new incoming packet:

/a/ means for determining the stream to which the packet belongs, a flow rate class being associated with said stream;

/b/ means for introducing the packet into a fair sharing organization mechanism for the purpose of delivering the packet, when said stream is part of a list of active streams, the fair sharing organization mechanism being designed to deliver the packets from each stream substantially as per the same fair flow rate weighted by the flow rate class associated with the corresponding stream;

/c/ means for, when said stream is not part of the list of active streams:
  obtaining an estimate of the quantity of incoming data items in relation to said stream over a reference time interval;
  comparing the estimate of the quantity of incoming data items in relation to said stream over the reference time interval with a maximum value, at least either the reference time interval or the maximum value being determined on the basis of an estimate of the fair flow rate;
  adding said stream to the list of active streams and introducing the packet into the fair sharing organization mechanism for the purpose of delivering the packet if the estimate of the quantity of incoming data items in relation to said stream over the reference time interval exceeds the maximum value; and
  otherwise, introducing the packet at the end of a priority queue for the purpose of delivering the packet.

The invention also proposes a router designed to incorporate the aforementioned equipment.

Finally, the invention proposes [a computer program product comprising instructions capable of implementing organization of data packets belonging to streams as per the following steps, in relation to each new incoming packet, when said program is loaded and executed by computer means:] a computer program product comprising memory encoded with computer-executable instructions for organizing data packets belonging to streams, the computer-executable instructions comprising:

/a/ determining the stream to which the packet belongs, a flow rate class being associated with said stream;

/b/ when said stream is part of a list of active streams, introducing the packet into a fair sharing organization mechanism for the purpose of delivering the packet, the fair sharing organization mechanism being designed to deliver the packets from each stream substantially as per the same fair flow rate weighted by the flow rate class associated with the corresponding stream;

/c/ when said stream is not part of the list of active streams:
  obtaining an estimate of the quantity of incoming data items in relation to said stream over a reference time interval;
  comparing the estimate of the quantity of incoming data items in relation to said stream over the reference time interval with a maximum value, at least either the reference time interval or the maximum value being determined on the basis of an estimate of the fair flow rate;
  adding said stream to the list of active streams and introducing the packet into the fair sharing organization mechanism for the purpose of delivering, the packet if the estimate of the quantity of incoming data items in relation to said stream over the reference time interval exceeds the maximum value; and otherwise, introducing the packet at the end of a priority queue for the purpose of delivering the packet.

BRIEF DESCRIPTION OF THE DRAWINGS

FIG. 6 is a structure example for a list of active streams as per the DRR organization mechanism;

FIG. 7 is a flowchart showing steps for introducing a packet for an active stream as per the DRR organization mechanism;

FIG. 8 is a flowchart showing steps for introducing a new active stream as per the DRR organization mechanism;

FIG. 10 is a structure example for a list of active streams as per the SFQ organization mechanism;

FIG. 11 is a structure example for a scheduler as per the SFQ organization mechanism;

FIG. 12 is a flowchart showing steps for introducing a packet from an active stream as per the SFQ organization mechanism;

DESCRIPTION OF THE EMBODIMENTS

Figure 1:
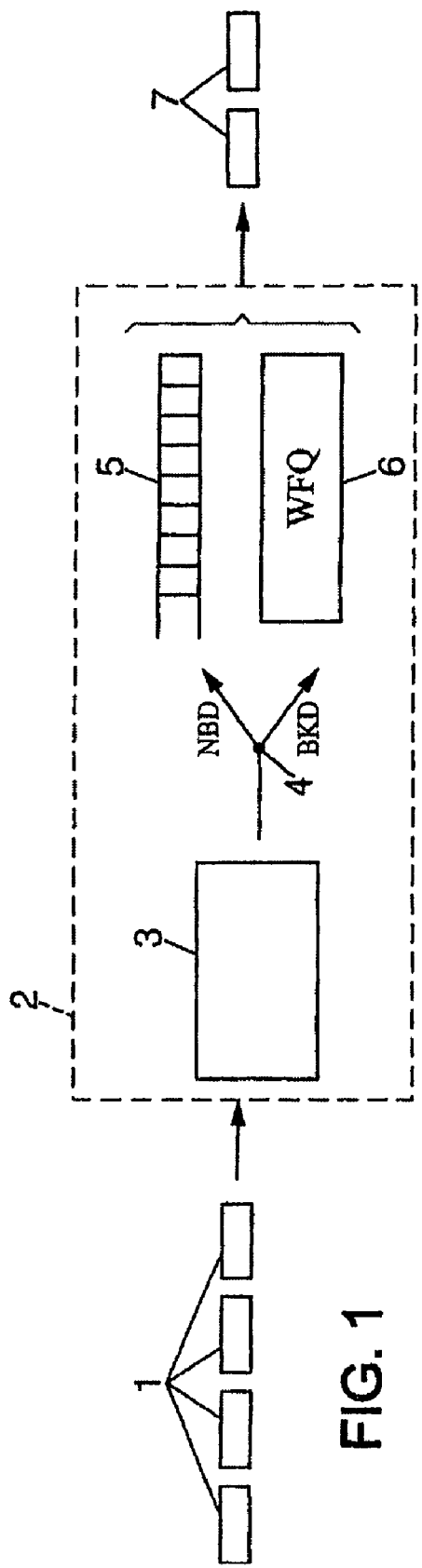
FIG. 1 is a diagram showing a simplified architecture for the organization of packets.

FIG. 1 schematically shows the architecture allowing organization of incoming data packets in the system. By way of example, the system in question comprises a router comprising, among other things, a piece of equipment 2 which receives incoming packets 1 and outputs packets 7 corresponding to at least some of the incoming packets 1. These packets 7 are delivered over a link controlled by the equipment 2. They are sent in a certain order determined by the organization implemented by the system.

As explained in the introduction, the packets 1 under consideration belong to streams. A distinction is established between BKD streams and NBD streams. To this end, upon the arrival of a packet 1, it is detected whether the stream to which this packet belongs is of BKD or NBD type (alternative 4 in FIG. 1). If the packet under consideration belongs to an NBD stream, it is introduced at the end of a priority queue 5, subsequently denoted by PQ. By way of example, this queue is of FIFO (First In First Out) type. If, conversely, the packet belongs to a BKD stream, then it is introduced into a fair sharing organization mechanism 6 of WFQ (Weighted Fair Queuing) type, for the purpose of delivering it.

Figure 2:
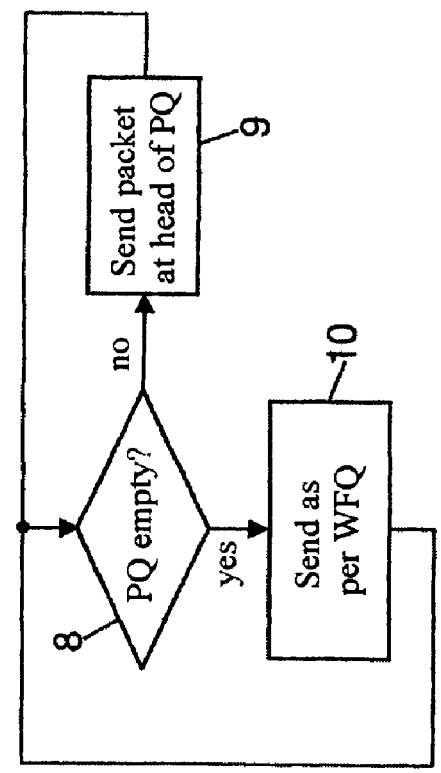
FIG. 2 is a diagram showing a method for delivering the packets.

FIG. 2 shows the method for delivering the packets 7 at the output of the organization. First of all, the state of occupation of the priority queue PQ is checked (step 8). If PQ contains at least one queuing packet, it needs to be delivered as priority (step 9). If the queue PQ is of FIFO type then it is emptied starting at the head, that is to say by the packets which entered the queue first. On the other hand, if PQ is empty, this means that all of the packets belonging to NBD streams have already been delivered. One or more packets, belonging to BKD streams, are then delivered which were previously introduced into the WFQ organization mechanism 6 (step 10). The order in which these packets are sent is dependent on the organization mechanism 6 implemented. The queue PQ is then revisited to check whether it contains new packets to be delivered. The instant of return to the queue PQ is also dependent on the organization mechanism 6 implemented. Examples of such mechanisms will be given later.

Thus, packets from NBD streams can be sent with priority without harming the flow rate produced by BKD streams. Such priority processing also allows the packet delay for NBD streams with a low flow rate to be reduced, which is advantageous for a large number of streaming-type applications.

It will be noted that an admission control 3 can be implemented, optionally, at the input to the equipment 2. An example of a mechanism of this kind is the implicit admission control described in EP 1478140. The aim of this is to limit congestion situations. To this end, the available passband for the link controlled by the equipment 2 is checked to determine whether it is higher than a first threshold, and the load owing to the packets placed in the priority queue is checked to determine whether it is lower than a second threshold. If not, only packets from protected streams are accepted, that is to say from streams which are permitted to transmit. The other packets are rejected before being able to be subjected to organization. In this way, the quality of service of streams which have already been started is protected.

In line with the invention, only active streams of BKD type are considered in relation to WFQ organization. Operation will be better understood in the light of FIG. 4, which shows the main steps of organization implemented for each new packet entering the system.

Let P be an incoming packet of length L. This packet belongs to a stream F, an identifier for which can be deduced from the header of the packet P by the system under consideration (for example the equipment 2 in FIG. 1). The length L of P is likewise detected by the system. When P arrives in the system, a logic variable "Silence" may take the value "False" (step 20), which signifies that the system contains at least one packet to be delivered. This variable will be used to calculate the fair flow rate relative to the WFQ organization mechanism, as will be detailed later.

The presence of the stream F in a list ActiveList is checked, for example using its identifier (step 21). ActiveList is designed to comprise all active streams of BKD type only. Such a list therefore has limited size, particularly because it does not include streams of NBD type. The way in which this list is formed will become apparent later.

If the stream F to which the packet P belongs is already part of ActiveList, which means that F is a BKD stream which is already known as such by the system, then the packet P is introduced into the WFQ organization mechanism, for the purpose of delivering it (step 22).

Otherwise, the flow rate of F is estimated relative to the fair flow rate produced at the current instant by the WFQ organization (steps 23-25). If the flow rate of F is higher than an estimate of the fair flow rate then the stream F is a stream of BKD type and it will be added to ActiveList (step 27). In this case the packet P from the stream F is introduced into the WFQ organization mechanism for the purpose of delivering it (step 26).

Conversely, if the flow rate of F is lower than the estimate of the fair flow rate, this means that F is an NBD stream and it is then advisable to introduce its packet P at the end of the priority queue PQ, for the purpose of delivering it (step 28). It is noted that, in this case, the stream F is not added to ActiveList even though it has a packet queuing in the system. This is how ActiveList is guaranteed to contain only active streams of BKD type.

Figure 3:
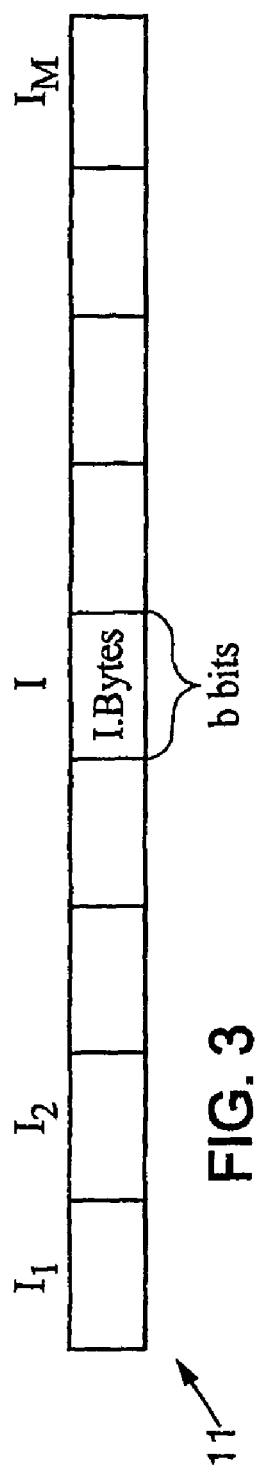
FIG. 3 is a diagram of a data structure used for detecting new streams.

To estimate the flow rate of the stream F relative to the fair flow rate produced at the current instant by the WFQ organization, benefit is advantageously derived from the data structure 11 shown in FIG. 3. This structure is a table comprising M items which each have b bits, M and b being integers. Each item in this table is identified by an address $I_1, I_2, \ldots I, \ldots, I_M$. Moreover, these addresses correspond to values which are each obtained by applying a function, for example a hash function, to a stream's identifier.

Figure 4:
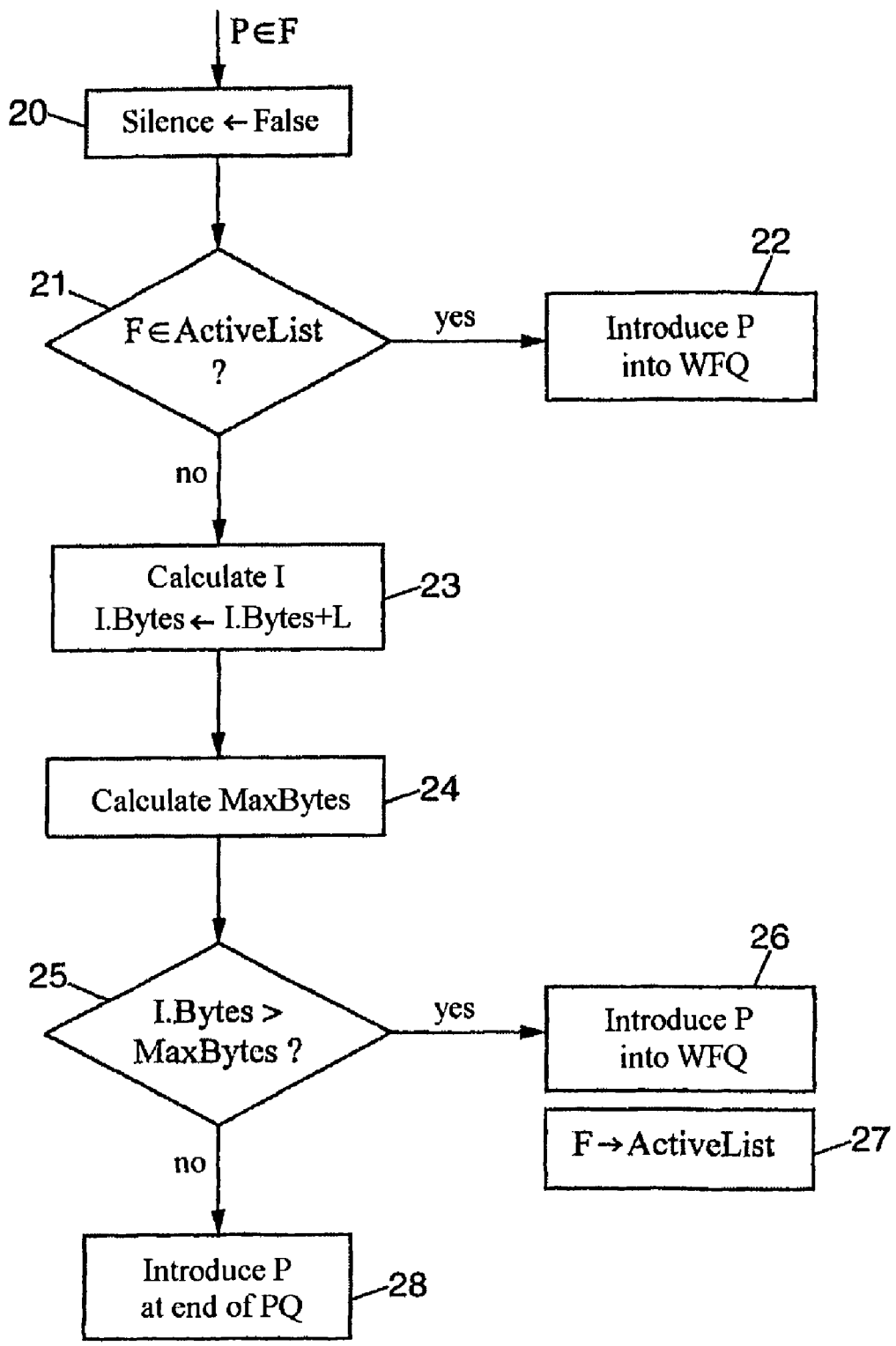
FIG. 4 is a flowchart showing main steps in the organization of the packets to be delivered.

When, in the succession of operations shown in FIG. 4, the stream F has been identified, the value I corresponding to the application of said function to the identifier of F is calculated. This value makes it possible to find the field in the table 11, for address I, so as to update the counter value I.Bytes stored therein (step 23). Thus, the I.Bytes counter represents the quantity of data items received at the input of the system in relation to the stream F, during a reference time interval. This is because each I.Bytes counter is reset to zero at the start of each reference time interval.

In step 24 in FIG. 4, the maximum number of bytes Max-Bytes that a stream would be able to send in a reference time interval without being of BKD type is also calculated.

In one embodiment of the invention, the reference time intervals mentioned above are chosen such that a stream whose flow rate class is the lowest is BKD if it sends it more than one maximum value of MTU bytes, for example 1500 bytes. This point will be explained in detail later.

When the WFQ organization mechanism is of DRR type, MaxBytes can be calculated as follows. If Q_i is the quantum of bytes in a stream of flow rate class i, then Q_≧MTU is set for every class. A stream of class i is supposed to be BKD if, in the course of a reference time interval, the corresponding counter in the table 11 exceeds Q_i. The definition MaxBytes=Q_i therefore applies.

When the WFQ organization mechanism is of SFQ type, MaxBytes can be calculated as follows. If R_i is the flow rate parameter for streams of class i, the condition R_≧1 is set for any i. A stream of class i is supposed to be BKD if, in the course of a reference time interval, the corresponding counter in the table 11 exceeds R_i.MTU. The definition MaxBytes=R_i.MTU therefore applies.

A comparison of the values I.Bytes and MaxBytes obtained in the manner indicated above (step 25) therefore makes it possible to determine whether the stream under consideration is of BKD or NBD type.

It is noted that the flow rate class of a stream can be deduced, by way of example, from fields in the header of each incoming packet belonging to this stream. As an example, the class can be deduced from the IP addresses or from the DSCP (Diffsery Code Point) field included in the header of the packets.

In another embodiment, the reference time intervals are independent of the fair flow rate produced at the current instant by the WFQ organization. On the other hand, in step 25 the I.Bytes counter is compared with a maximum value MaxBytes which is dependent on the fair flow rate. It is likewise possible to envisage combining the two embodiments. In this case, the reference time intervals and the value MaxBytes are each dependent on the fair flow rate.

To make best use of the b bits of the I.Bytes counter, the value of the unit is adapted to the limit MaxBytes of the stream in question. Thus, for a packet of length L, the corresponding I.Bytes counter would be incremented by $I=\lceil(2^b-1)L/MaxBytes\rceil$ units, where $\lceil x \rceil$ denotes the integer immediately above or equal to x. Thus, when a packet which would make the counter overflow arrives, it is decided that this stream is BKD.

Such a decision is sometimes incorrect. A distinction is drawn between "false positive" errors, where a stream is incorrectly denoted BKD, and "false negative" errors, where a BKD stream is not detected as such.

False positive errors may arise when the result of applying the hash function to identifiers of at least two active streams is identical. It is then possible that the corresponding I.Bytes field is overestimated because it is incremented by the quantity of data items received for each of these streams in the reference time interval under consideration (see step 23). This could result in the I.Bytes counter overflowing, to the extent that one of the active streams to which it corresponds is incorrectly considered to be a BKD stream. It is noted that such a collision between two separate streams results in a false positive only when it arises in the course of the same reference time interval.

False positive errors can also arise when the granularity chosen for the number b of bits in the different fields of the table 11 is too low. This is because this results in the number of incoming bytes for each stream being overestimated. In an extreme example, when b=1, the I.Bytes counters can take only two values 0 or 1. Thus, when more than one packet 13 from a given stream is received in a reference time interval, such as the interval $[\tau_3;\tau_4]$ from FIG. 5, the I.Bytes counter associated with this stream overflows, causing the stream to be identified as a BKD stream. However, the total quantity of data items corresponding to the two packets 13 received in this interval may be lower than the maximum value Max-Bytes, for example if each of the packets 13 received contains 500 bytes, that is to say a total of 1000 bytes, whereas Max-Bytes is worth 1500 bytes, a typical MTU value.

False negative errors can arise when it takes a long time to recognize a BKD stream for which the arrival of the packets is in a poor position relative to the limits of the reference time intervals, which correspond to the instants at which the I.Bytes counters are reinitialized. Thus, in the example shown in FIG. 5, incoming packets 13 belonging to a stream are received at the rate of one per reference time interval on the occasion of the two first intervals $[\tau_1;\tau_2]$ and $[\tau_3;\tau_4]$ shown on the time axis 12. It is only in the following interval $[\tau_3;\tau_4]$ that two packets 13 are detected, such that the stream can then be considered to be BKD, whereas the flow rate for arrival of its packets has not varied substantially over the period shown.

It is noted that the probability of false positives is dependent on the choice of size for the data structure in FIG. 3. The greater the number M of counters in the structure, the lower the probability that the hashing of the identifiers of two separate streams coincides with the same counter address. Moreover, the greater the size b of a counter, the more precisely the number of bytes received in relation to a given stream is taken into account.

The probability of false negatives is, for its part, meaningful only for streams whose flow rate is close to the fair flow rate. The first packets of such a stream are sent to the queue PQ, as long as the stream is not identified as a BKD stream, which hardly harms the effectiveness of organization.

As mentioned further above, the special case b=1 deserves special attention. This is because in this case any stream is considered to be BKD as soon as it sends more than a single packet in a reference time interval, whatever its flow rate class. Despite a lack of precision which results therefrom for determining the BKD/NBD streams, this choice is appealing because it allows a very small size to be obtained for the data structure in FIG. 3. Moreover, it has reduced complexity because the flow rate class is not taken into account.

It will be noted that the data structure presented with reference to FIG. 3 is a simple linear structure of M counters, each corresponding to the sole image of a set of stream identifiers. Generally, it is possible to reduce the size of memory required by adopting a more complex structure.

In particular, the techniques of the Bloom filter, described in the article B. Bloom, "Space/time tradeoffs in hash coding with allowable errors, Commun. ACM, vol. 13, no. 7, pp. 422-426, July 1970", or of multilevel bitmaps described in the article by C. Estan, G. Varghese, "New directions in traffic measurement and accounting, Proceedings of ACM Sigcomm 2002", make use of several hash functions applied to the stream identifier and denoting a set of counters. In the present application, each counter in the set corresponding to a stream would be updated as described before. The BKD condition would be assumed if all of these counters had to overflow when a new packet arrived.

Embodiment of the Invention with DRR

The text below states the principles of the invention in a particular embodiment, in which the fair sharing organization mechanism used is the known DRR mechanism.

FIG. 6 shows a possible structure for ActiveList. This list comprises one line per stream. Each line 31 contains the following data in columns (from left to right in the illustrated example):

F: a stream identifier;
F.Queue: the current size, in bytes, of the queue relative to the packets of F;
F.Q: the quantum expressing the number of bytes that the stream is authorized to send during a cycle of the algorithm;
F.DC: the stream's deficit counter;
F.FIFO: all memory addresses and pointers allowing identification of the packets in the stream in the order first come, first served; and
F.Next: the pointer to the next stream in the list which needs to be dealt with (all of the pointers define the scheduler).

A specific input 30, in ActiveList, is reserved for a fictitious stream called stream 0. This stream joins the scheduler and allows the cycles to be delimited; a new cycle of the DRR algorithm starts after every visit by the stream 0 (where of course no packets are sent).

To complete the definition of the scheduler, two global variables are used:

HeadRound: denotes the stream which needs to be dealt with first, when it is the turn of the WFQ organization to send; and
TailRound: denotes the stream still present in ActiveList which has sent a packet last or else the fictitious stream 0 if it has received a visit after this sending.

FIG. 7 illustrates the operations performed upon introducing a packet P belonging to a stream F which is already present in ActiveList (which corresponds to step 22 in FIG. 4), implying that the queue of packets is not saturated for this stream. The packet P is introduced at the end of the queue F.FIFO, which is updated as a result (step 32). The current size of the queue relative to the packets of F is then increased by the length L of the packet P (step 33).

FIG. 8 shows the operations carried out when adding a new stream F to ActiveList (which corresponds to step 27 in FIG. 4). The corresponding quantum F.Q can be deduced from some fields of the header of the incoming packet belonging to the stream F, as explained further above, by applying a classifying function. Moreover, the deficit F.DC is initialized to the value zero. The queue F.FIFO takes account of the incoming packet P from the stream F, and the current size of the queue F.Queue is increased by the length L of the packet P (step 35).

The stream F is then inserted into the scheduler (step 36). To this end, the stream F is considered to be the last stream processed in the cycle, while the following stream F becomes the first to need to be dealt with when it is the turn of the WFQ organization to send.

Figure 9:
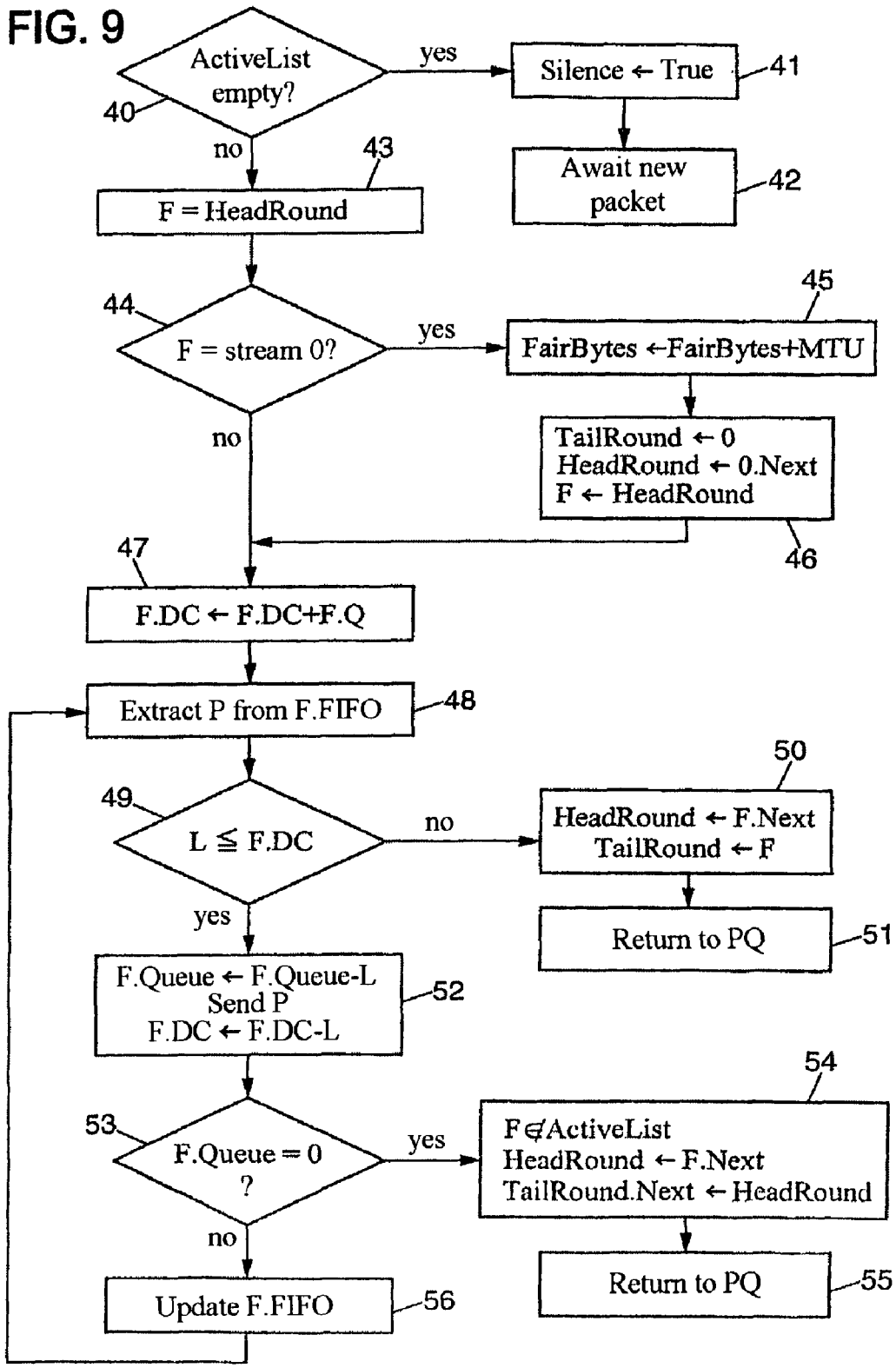
FIG. 9 is a flowchart showing steps for delivering packets as per the DRR organization mechanism.

The main steps implemented in relation to delivery of packets are shown schematically in FIG. 9. These steps are implemented only when the priority queue PQ is empty.

It is assumed below that the queue PQ is not revisited until all of the packets representing the quantum of the stream under consideration have finished being dealt with. It will be noted that another hypothesis according to which it would be possible to deal with some packet present in the queue PQ between two packets from the quantum of the same stream is also possible.

First of all, ActiveList is checked to determine whether it is empty (step 40). If it is, this means that there are no packets to be sent as per the DRR organization. Furthermore, as the queue PQ is empty, it is therefor'e possible to set the variable Silence to the value "True" (step 41), then to wait for a new packet (step 42).

If ActiveList is not empty, on the other hand, the stream F at the head of the scheduler is considered, which needs to be dealt with first, that is to say like F=HeadRound (step 43).

This stream F is checked to determine whether it is the stream 0, that is to say the fictitious stream (step 44). If so, the value of a FairBytes counter, which denotes the number of bytes which could have been sent by the fictitious stream if it were a real stream of the lowest flow rate class, is increased by the number MTU of bytes (step 45). The FairBytes counter is used to calculate the fair flow rate, as will be explained in detail below. The variables TailRound and HeadRound are likewise updated, to take the values 0 and 0. Next respectively, in order to indicate that the fictitious stream has been dealt with and to prepare to deal with the next stream in ActiveList, which from that point onward is the next stream to be dealt with (step 46). The algorithm then continues with step 47.

If the stream F is not the fictitious stream, the algorithm likewise moves to step 47, in which the deficit value F.DC for this stream is increased by its quantum F.Q.

A packet P is then extracted from the queue F.FIFO identifying all of the stream's packets which have entered the system (step 48). This packet P is the one which arrived first in this queue and which is therefore situated at the head of F.FIFO.

The length L of this packet P is compared with the value of the deficit F.DC for the corresponding stream F. If L>F.DC then it is not possible to deliver this packet P and the values of TailRound and HeadRound are updated so that the next stream is dealt with in the next cycle (step 50). The priority queue PQ is then revisited (step 51).

If L≦F.DC, the packet P can be sent. The variables F.Queue and F.DC are reduced by the length L of P to take account of the sending of the packet P (step 52).

The value of F.Queue is then checked (step 53). If it is equal to zero this means that the queue relating to the packets in F is empty, that is to say that the stream F is no longer active because it has no more packets waiting to be delivered. The stream F can then be removed from ActiveList. Moreover, ActiveList is updated so that the next stream is dealt with in the next cycle (step 54). The priority queue PQ is then revisited (step 55).

If, conversely, the value of F.Queue is not zero, the queue F.FIFO is updated, so as to take account of the sending of the packet P (step 56). Under the chosen hypothesis that all of the quantum of the stream is delivered before the priority queue PQ is revisited, the algorithm then returns to step 48, for the purpose of sending other packets for the stream F under consideration.

Embodiment of the Invention with SFQ

The text below sets out the principles of the invention in a particular embodiment, in which the fair sharing organization mechanism used is the known SFQ mechanism.

FIG. 10 shows a possible structure for ActiveList. This list comprises one line per stream. Each line 60 contains the following data in columns (from left to right in the example shown):

F: an identifier for the stream;
F.Queue: the current size, in bytes, of the queue relating to the packets of F;
F.R: the parameter expressing the relative flow rate of the stream (F.R≧1 is set without any loss of generality);
F.FinishTag: a variable allowing the stamp for the packets to be calculated and BKD streams to be removed from ActiveList; and
F.FIFO: all memory addresses and pointers allowing identification of the packets of the stream in the order first come, first served.

FIG. 11 shows a possible structure for a scheduler which determines the order in which the packets are sent. Each stream F has an associated stamp F.TimeStamp. The streams are visited in increasing stamp order. Upon each visit, according to the scheduler, a stream sends the packet which is at the head of its queue F.FIFO.

In addition, use is made of the following two global variables:

VirtualTime: allows calculation of the stamps; and
LastTime: is used to measure the reference time intervals.

FIG. 12 shows the operations performed when introducing a packet P belonging to a stream F which is already present in ActiveList (which corresponds to step 22 in FIG. 4). The packet P is introduced at the end of the corresponding queue F.FIFO (step 62).

It may arise that the queue F.FIFO for this stream is empty (step of checking 63 the value of F.Queue). If it is, the stream is re-added to the scheduler with a stamp equal to F.FinishTag (step 64).

When F.FIFO is not empty or once the stream has been re-added to the scheduler, the current size of the queue is updated in order to take account of the addition of the packet P, as well as the variable F.FinishTag (step 65). Updating F.FinishTag takes account of the flow rate class, the increment being inversely proportional to F.R.

Figure 13:
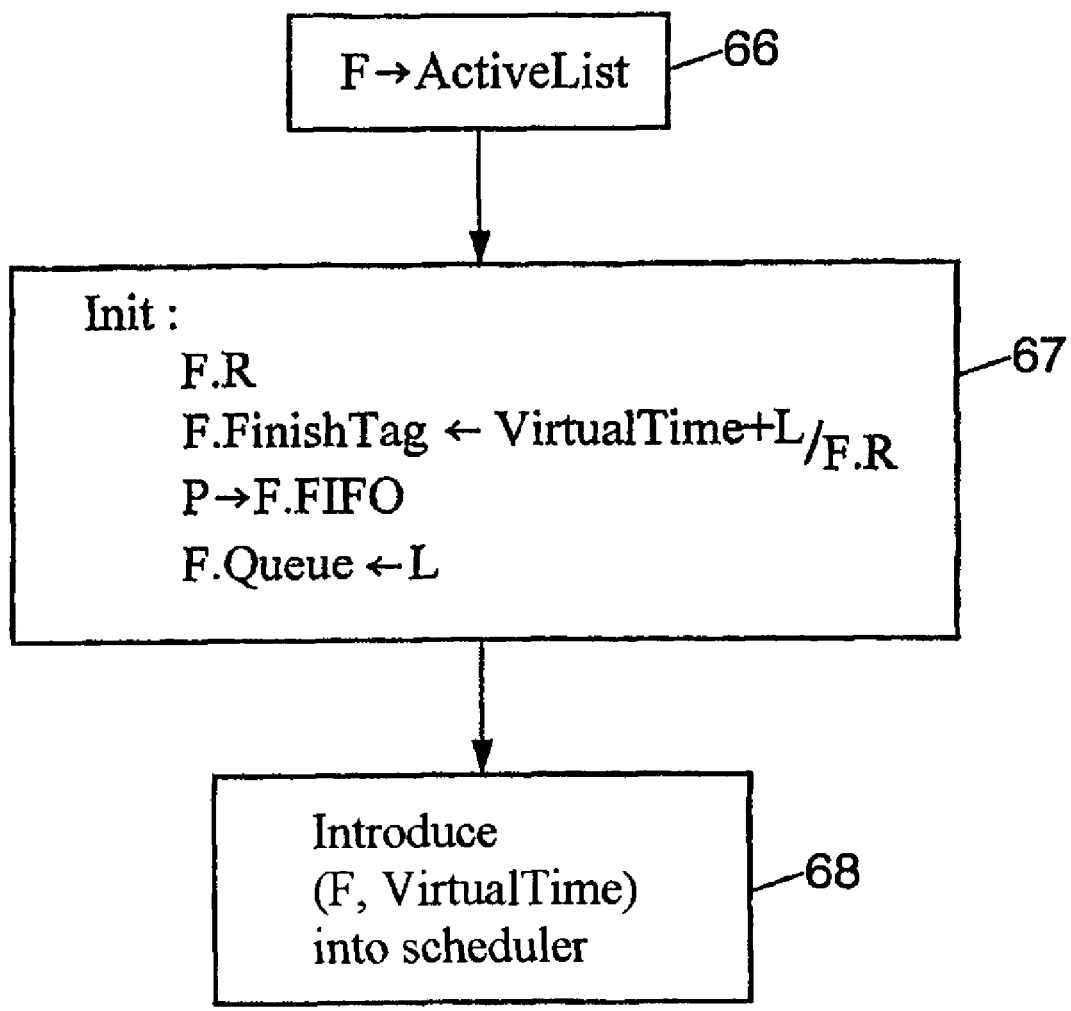
FIG. 13 is a flowchart showing steps for introducing a new active stream as per the SFQ organization mechanism.

FIG. 13 shows the operations performed when adding a new stream F to ActiveList (which corresponds to step 27 in FIG. 4). The stream F is added to ActiveList (step 66). Next, the different fields of ActiveList corresponding to this stream F are initialized, that is to say F.R, F.FinishTag, which is set to the value VirtualTime+L/F.R, F.FIFO, which contains the incoming packet P, and F.Queue, which takes the value of the length L of the packet P (step 67).

The stream F, with a stamp set to the value of VirtualTime, is furthermore added to the scheduler (step 68).

Figure 14:
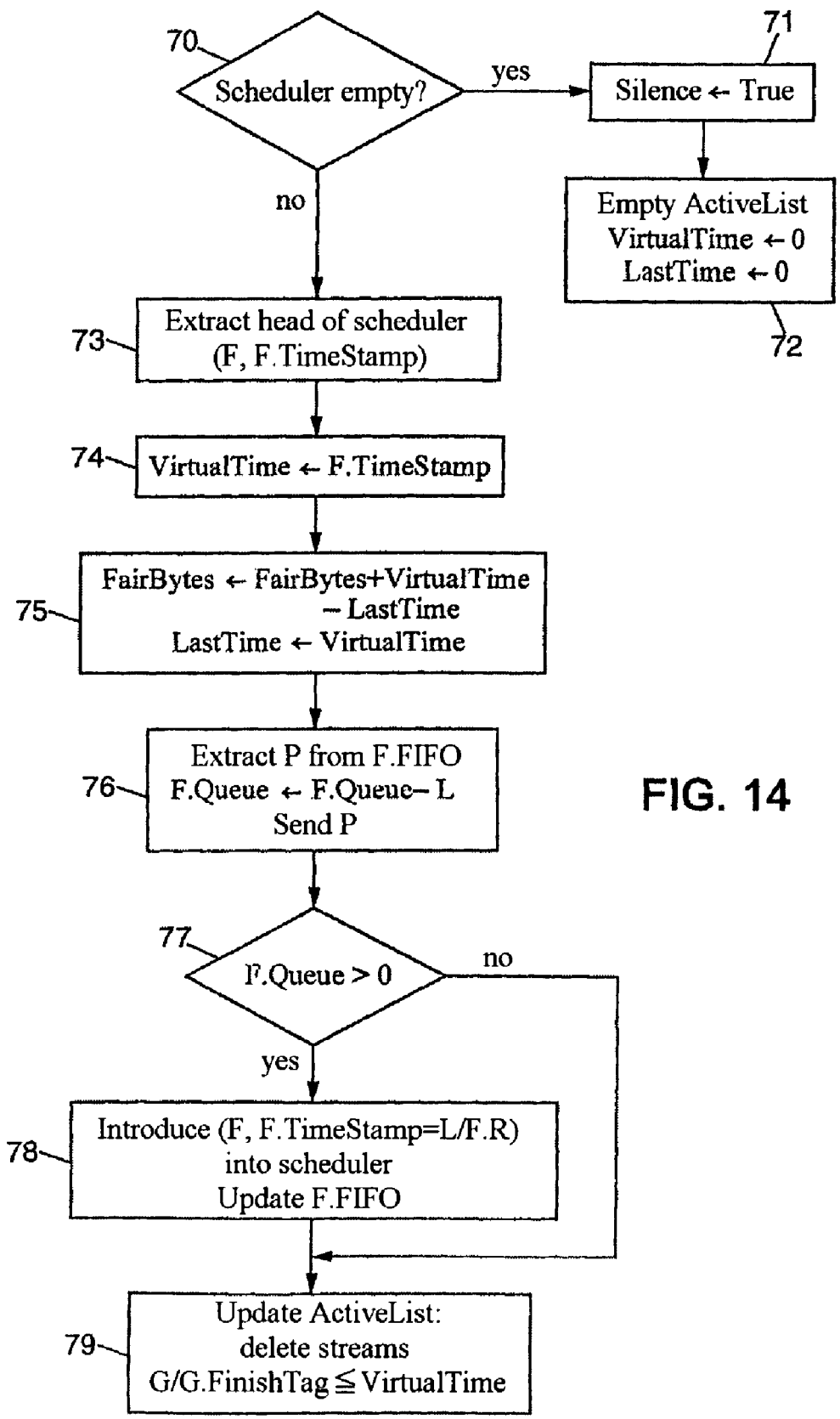
FIG. 14 is a flowchart showing steps for delivering packets as per the SFQ organization mechanism.

The main steps implemented in relation to delivery of packets are shown schematically in FIG. 14. First of all, the scheduler is checked to determine whether it is empty (step 70). If it is, this means that there are no packets to send as per the SFQ organization. Furthermore, as the queue PQ is empty, the variable Silence can therefore be set to the value "True" (step 71). Next, ActiveList is emptied for the case in which there would still be streams which are nonetheless not active because they do not appear in the scheduler (step 72). It is also possible to re-initialize the variables VirtualTime and LastTime to zero.

If the scheduler is not empty, the head of the scheduler is removed, namely the stream F associated with the stamp F.TimeStamp (step 73). The variable VirtualTime is then set to the value of F.TimeStamp (step 74).

Next, a FairBytes counter measuring the quantity of bytes which a fictitious BKD stream with a flow rate parameter R=1 (one byte for each unit of progression in virtual time) would have been able to send if it had been a real stream is updated. Similarly LastTime is updated using VirtualTime (step 75).

Next, the packet P which is at the head of the queue F.FIFO is removed, the current size F.Queue of the queue F is updated by deducting from it the length L of the packet P, and the packet P is sent (step 76).

The size F.Queue is then checked to determine whether it is positive. If it is, the stream F is reintroduced into the scheduler with a new stamp value set to F.TimeStamp+L/F.R. Furthermore, the queue F.FIFO is updated, so as to take account of the sending of the packet P (step 78).

Finally, ActiveList is updated by removing any stream G which still appears in it while G.Finishtag≦VirtualTime, that is to say any streams which are therefore no longer in the BKD category (step 79).

Fair Flow Rate and Consideration for Determining BKD Streams

It will be recalled that the fair flow rate denotes the flow rate presented by the packets in each BKD stream at the output of the fair sharing organization mechanism (apart from the flow rate class for said stream).

The fair flow rate can therefore be considered to be the flow rate which would be obtained by a fictitious stream still in the BKD state and for which the quantum Q would be worth MTU in the case of a DRR mechanism or for which the flow rate parameter R would be worth 1 in the case of an SFQ mechanism. The fair flow rate can be estimated according to the principles described in EP 1478140.

The fair flow rate is used particularly to determine the reference time intervals, as will be explained further below.

It will be recalled that the logic variable Silence makes it possible to detect whether or not the system is empty at any instant. It is thus possible to use this variable to calculate the total period of silence SilenceTime(t1,t2) in any time interval (t1,t2).

It will also be recalled that the FairBytes counter is incremented, in the case of DRR, whenever the stream 0 passes through the queue (see FIG. 9) and, in the case of SFQ, whenever the virtual time VirtualTime changes (see FIG. 14). It thus allows the number of bytes which a fictitious BKD stream could have sent to be measured.

Let FairBytes(t) be the value of the FairBytes counter at the instant t. The average fair flow rate DE(t1,t2) in the course of an interval (t1,t2) is estimated as per the following formula:

$$DE(t1,t2) = \mathrm{Max}\{\mathrm{SilenceTime}(t1,t2) \cdot C/(t2-t1); (\mathrm{FairBytes}(t2) - \mathrm{FairBytes}(t1)) * 8/(t2-t1)\}$$

where C denotes the total flow rate provided by the link under consideration.

It is understood that the first term in this formula will be in the ascendancy when there is a low load on the system, while the second term will be in the ascendancy when there is a high load.

As was described further above, the reference time intervals are determined such that a stream which has not yet been added to ActiveList must be detected as BKD if it sends at a higher flow rate than a current estimate of the fair flow rate weighted by the weight required in order to take account of the flow rate class for the stream in question.

One possible method for making this estimate is the following one. First of all, the fair flow rate DE(n) is evaluated at instants nT, where T is a fixed interval (for example 100 ms) and n is an integer, such that DE(n)=DE((n−1)T,nT). Smoothing, for example exponential smoothing, of the evaluations DE(n) is then carried out, that is to say that at each instant nT the FairRate estimate of the smoothed fair flow rate is re-updated as follows:

$$\text{FairRate} \leftarrow \alpha \text{FairRate} + (1-\alpha)\text{DE}(n), \text{ where } 0 \leq \alpha \leq 1.$$

Figure 5:
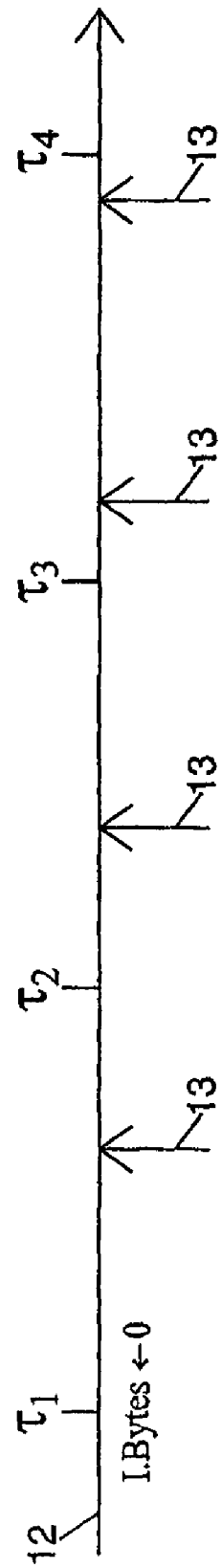
FIG. 5 is a diagram showing BKD stream detection.

Let $\tau 1$ be the start of a reference time interval, as shown in FIG. 5. It will be recalled that such an instant corresponds to the I.Bytes counters contained in the data structure as shown in FIG. 3 being reset to zero. The next instant $\tau 2$, which corresponds to the end of a reference time interval (and to the start of another one), is calculated:

$$\tau 2 = \tau 1 + \text{MTU} \ast 8 / \text{FairRate}$$

where FairRate is the current estimate of the fair flow rate at the instant $\tau 1$.

In this way, the sequence of reference time intervals is defined. As is obvious in the light of what goes before, these intervals are therefore directly dependent on the fair flow rate produced by the fair sharing organization mechanism implemented.

The choice of T and of $\alpha$ determines the level of reaction from the algorithm. T should be large enough to allow at least MTU bytes to be sent in an interval ((n−1)T, nt) for any BKD stream. The closer a is to 1, the more the short-term variations in the fair flow rate blur. By way of example, a choice of T=100 ms and $\alpha$=0.9 seems to produce a large reduction in the number of streams in ActiveList, as well as a slight impairment in performance in comparison with conventional WFQ algorithms. Moreover, the choice seems not very critical in a fairly large range.

Simulations using paths of real traffic implementing fair sharing without weighting (Q_i=MTU or R_i=1) have made it possible to observe a reduction in the maximum number of streams in ActiveList from 540, with the conventional SFQ algorithm, to just 4 in line with the present invention, for a link concentrating ADSL user traffic (for which the flow rate per stream is in principle below 1 Mbps) and with a 90% load. This extreme gain results from the fact that, in this example, no stream is really in the BKD class. For a path observed on a link from the American research network Abilene, the reduction at the same rate of loading is from 362 to 128 streams. These results correspond to the choice for the data structure comprising the I.Bytes values for a bitmap (that is to say that b=1). The additional reduction obtained with 8-bit counters allows 106 streams to be achieved instead of 128 in the latter case, for example.

Generally, the invention makes it possible to limit the organization capacity to around one hundred streams, against several hundred streams as per known techniques, for a served link load of approximately 90%. This performance is accompanied by a reduction in the memory required for the organization's structure and also substantially limits the complexity of processing.

Moreover, this capacity is largely independent of the characteristics of the traffic and therefore constitutes strong dimensioning.

It is noted that the invention has been described more particularly in the special cases of the fair sharing organization mechanisms DRR and SFQ. However, it will be understood that it applies equally to any other fair sharing organization mechanism, such as a round robin mechanism, a stamping mechanism, or another mechanism.

The invention also extends to any equipment which is capable of being used to organize packets as per the method described above, such as the equipment 2 from FIG. 1, for example. It also extends to a router incorporating such equipment.

Furthermore, the invention extends to a computer program comprising instructions which are capable of implementing the method described above. Such a program may advantageously be installed and executed on a piece of equipment used to organize packets, such as a router.

The invention claimed is:

1. A method for organizing data packets belonging to streams, comprising:
   /a/ determining the stream to which an incoming packet belongs, wherein a flow rate class is associated with said stream;
   /b/ when said stream is part of a list of active streams, introducing the packet into a fair sharing organization mechanism for the purpose of delivering the packet, the fair sharing organization mechanism being designed to deliver the packets from each stream substantially as per the same fair flow rate weighted by the flow rate class associated with the corresponding stream; and
   /c/ when said stream is not part of the list of active streams:
      obtaining an estimate of the quantity of incoming data items in relation to said stream over a reference time interval;
      comparing the estimate of the quantity of incoming data items in relation to said stream over the reference time interval with a maximum value, at least either the reference time interval or the maximum value being determined on the basis of an estimate of the fair flow rate;
      adding said stream to the list of active streams and introducing the packet into the fair sharing organization mechanism for the purpose of delivering the packet, if the estimate of the quantity of incoming data items in relation to said stream over the reference time interval exceeds the maximum value; and
      otherwise, introducing the packet at the end of a priority queue for the purpose of delivering the packet.

2. The method as claimed in claim 1, wherein said maximum value is a quantity of data items dependent on the flow rate class associated with said stream.

3. The method as claimed in claim 1, wherein the estimate of the quantity of incoming data items in relation to said stream comprises an estimate of a number of incoming packets in said stream over the reference time interval and in which said maximum value is a fixed number of packets independent of the flow rate class associated with said stream.

4. The method as claimed in claim 1, wherein obtaining the estimate of the quantity of incoming data items in relation to said stream comprises updating, in the course of said reference time interval, a field in a table whose address corresponds to a function of an identifier of said stream, each field in the table being reset to zero at the start of the reference time interval.

5. The method as claimed in claim 1, wherein estimating the fair flow rate comprises successive evaluations of the fair flow rate and smoothing at least some of said successive evaluations.

6. The method as claimed in claim 1, wherein the fair sharing organization mechanism is part of at least either a round robin mechanism or a stamping mechanism.

7. The method as claimed in claim 1, comprising a prior admission control in which it is decided whether or not the packet needs to be rejected before step /b/, on the basis of an available passband and a filling level for the priority queue.

8. The method as claimed in claim 1, wherein all of the packets introduced into the priority queue are delivered, and then at least some of the packets introduced into the fair sharing organization mechanism are delivered.

9. An apparatus capable of being used to organize data packets belonging to streams, comprising:
/a/ means for determining a stream to which an incoming packet belongs, a flow rate class being associated with said stream;
/b/ means for introducing the packet into a fair sharing organization mechanism for the purpose of delivering the packet, when said stream is part of a list of active streams, the fair sharing organization mechanism being designed to deliver the packets from each stream substantially as per the same fair flow rate weighted by the flow rate class associated with the corresponding stream; and
/c/ means for, when said stream is not part of the list of active streams:
obtaining an estimate of the quantity of incoming data items in relation to said stream over a reference time interval;
comparing the estimate of the quantity of incoming data items in relation to said stream over the reference time interval with a maximum value, at least either the reference time interval or the maximum value being determined on the basis of an estimate of the fair flow rate;
adding said stream to the list of active streams and introducing the packet into the fair sharing organization mechanism for the purpose of delivering the packet, if the estimate of the quantity of incoming data items in relation to said stream over the reference time interval exceeds the maximum value; and
otherwise, introducing the packet at the end of a priority queue for the purpose of delivering the packet.

10. A router capable of being used to organize data packets belonging to a stream, comprising:
means for determining the stream to which an incoming packet belongs, a flow rate class being associated with said stream;
means for introducing the packet into a fair sharing organization mechanism for the purpose of delivering the packet, when said stream is part of a list of active streams, the fair sharing organization mechanism being designed to deliver the packets from each stream substantially as per the same fair flow rate weighted by the flow rate class associated with the corresponding stream; and
means for, when said stream is not part of the list of active streams:
obtaining an estimate of the quantity of incoming data items in relation to said stream over a reference time interval;
comparing the estimate of the quantity of incoming data items in relation to said stream over the reference time interval with a maximum value, at least either the reference time interval or the maximum value being determined on the basis of an estimate of the fair flow rate;
adding said stream to the list of active streams and introducing the packet into the fair sharing organization mechanism for the purpose of delivering the packet, if the estimate of the quantity of incoming data items in relation to said stream over the reference time interval exceeds the maximum value; and
otherwise, introducing the packet at the end of a priority queue for the purpose of delivering the packet.

11. A computer program product comprising memory encoded with computer-executable instructions for organizing data packets belonging to streams, the computer-executable instructions comprising:
determining the stream to which an incoming packet belongs, a flow rate class being associated with said stream;
when said stream is part of a list of active streams, introducing the packet into a fair sharing organization mechanism for the purpose of delivering the packet, the fair sharing organization mechanism being designed to deliver the packets from each stream substantially as per the same fair flow rate weighted by the flow rate class associated with the corresponding stream; and
when said stream is not part of the list of active streams:
obtaining an estimate of the quantity of incoming data items in relation to said stream over a reference time interval;
comparing the estimate of the quantity of incoming data items in relation to said stream over the reference time interval with a maximum value, at least either the reference time interval or the maximum value being determined on the basis of an estimate of the fair flow rate;
adding said stream to the list of active streams and introducing the packet into the fair sharing organization mechanism for the purpose of delivering the packet, if the estimate of the quantity of incoming data items in relation to said stream over the reference time interval exceeds the maximum value; and
otherwise, introducing the packet at the end of a priority queue for the purpose of delivering the packet.

* * * * *